Patented Sept. 4, 1951

2,567,076

UNITED STATES PATENT OFFICE 2,567,076

PRODUCTION OF POLYOXYETHYLENE GLYCOL SUPERESTERS

Samuel M. Livengood, Pittsburgh, Pa., assignor, by mesne assignments, to Union Carbide and Carbon Corporation, a corporation of New York No Drawing. Application November 6, 1947, Serial No. 784,517

24 Claims. (Cl. 260—75)

This invention relates to the production of novel, water-soluble polymeric esters of polyoxyalkylene glycols of high molecular weights; and more especially it concerns the production of such polymeric esters in the form of water-soluble waxes having melting points near but below the melting points of the polyoxyalkylene glycols from which they are derived, these initial softening points being usually within the range between 40° C. and 60° C. Such polymeric esters are useful for a wide variety of purposes, e. g., as components of coating, impregnating and adhesive compositions such as shoe creams and polishes, water paints and textile sizing compositions. They also are useful as dispersing agents, mold lubricants, binders for ceramics and pigments, ointment bases and the like.

Certain of the polymeric esters of the invention are in the form of hard, tough, water-soluble waxes having especial utility in the production of destructible wax patterns used in the manufacture of precision casting molds by the investment molding process, and useful in making composite wax patterns employed in the production of hollow precision castings by processes such as that described in United States Patent No. 2,420,851. Other members of this class of polymeric esters are brittle water-soluble waxes which, while not suitable as such for the production of wax patterns, have a wide field of utility in connection with various coating, impregnating, laminating and other compositions.

The search for tough, hard, non-friable water-soluble waxes suitable for the production of composite wax patterns from which molds for precision casting operations can be prepared has led to numerous attempts to modify the wax-like polyoxyethylene glycols of high average molecular weights ranging from 4,000 upward in efforts to reduce the brittleness of such products without unduly reducing their water solubility. In connection with these efforts, various esterification products of these polyoxyethylene glycols with dicarboxylic acids and their anhydrides have been made. Such esterification products, however, are neither tough enough nor sufficiently non-friable to be useful for making wax patterns and for various other purposes, excepting in instances where the dicarboxylic acid or anhydride employed had at least one ethylenic double bond in an open carbon chain, such as in the case of maleic anhydride. The esters of such polyoxyethylene glycols with saturated dicarboxylic acids and their anhydrides, such as succinic acid, and with benzene dicarboxylic acids such as phthalic acid and its anhydride, are brittle products very similar in physical properties to the polyoxyethylene glycol starting material used.

The present invention is based in part upon the discovery that by reacting under suitable conditions a polyoxyethylene glycol having an average molecular weight of at least 4,000, and preferably between 4,000 and 12,000, or a mixture of such polyoxyethylene glycols, with at least one-half the molecular equivalent thereof of an acyl halide of a dicarboxylic acid of the type hereindescribed, alone or in conjunction with certain halides of phosphorus and silicon, polymeric wax-like esters are produced which, while being water-soluble, have greatly increased hardness and toughness. These polymeric esters in general have initial softening points within the range from 40° C. to 60° C.

The total halide content of the acid halide of the dicarboxylic acid, including the halide content of the phosphorus oxyhalide or other halide of phosphorus or silicon, when used, should be sufficient to provide reactive halogen groups equivalent to not less than 50% and not substantially more than 200% of the hydroxyl groups of the polyoxyethylene glycol used.

In accordance with one form of the invention, a substantially dry polyoxyethylene glycol of high molecular weight, preferably in solution in a volatile solvent inert to the reactants, is refluxed with agitation while adding thereto an acid halide of a saturated aliphatic dicarboxylic acid, or of a halide of a benzene dicarboxylic acid. The said glycol ether and the acid halide may be reacted in molar ratios within the range between 1:0.5 and 1:2, but excellent results are secured by the use of approximately equivalent molar ratios of the glycol ether and said acid halide. An esterification catalyst such as sulfuric acid, hydrochloric acid or the equivalent may be present in the reaction mixture, but is not necessary. Preferably a dry inert gas such as nitrogen, air or carbon dioxide is passed through the reaction mixture to facilitate removal of the hydrogen halide released during the reaction. The refluxing of the mixture with agitation is continued until the reaction is near completion as determined by reduction in the amount of hydrogen halide being formed. The reaction mixture then is stripped of volatiles at temperatures sufficiently high to remove the solvent and any unreacted acyl halide, this usually being effected in a still heated to a kettle temperature of at least 150° C. under subatmospheric pressure while agitating the mixture. It is not essential that the initial mixture be refluxed during the action, it being only necessary that the mixture be agitated while being maintained at a temperature above the melting point of the polyoxyethylene glycol, and preferably at least 20° C. above such melting point.

Among the acyl halides of dicarboxylic acids useful in the process may be mentioned the halides of the saturated aliphatic dicarboxylic acids such as oxalyl chloride, malonyl chloride, succinyl chloride, dimethyl succinyl chloride, and glutaryl chloride; and the halides of benzene dicarboxylic acids such as phthalyl chloride and terephthalyl chloride.

While all of the polyoxyethylene glycols of the class hereindescribed can be employed in the process to give waxes that are tougher than the unreacted starting material, the change is most striking in the case of polyoxyethylene glycols having average molecular weights within the range between 4,000 and 9,000. Those having molecular weights below 600 yield products that more nearly approach the conventional alkyd resins.

The principal reaction involved is a condensation of the polyoxyethylene glycol with the acyl halide to give a polymerization of the type wherein long chains of the unit —$CH_2CH_2O$— are combined through the formation of multiple ester linkages to give chains with much greater overall length than the original polyoxyethylene glycol chain.

The production of tough, water-soluble products when using acid halides of dicarboxylic acids in the process is surprising, since the anhydrides of these acids and the acids themselves do not yield such products. This may be because the reactions of these glycol ethers with dicarboxylic acids yields half esters which are resistant to further reaction, whereas, in the case of the dicarboxylic acid halides, the reaction forming a half ester still leaves available one very active acid halide group capable of reaction with another hydroxyl hydrogen of the same or another molecule of the polyoxyethylene glycol.

A great increase in toughness of the waxy polymeric esters of the invention appears at an indicated average molecular weight of about 30,000, when measured in the manner herein indicated.

According to one important and highly preferred modification of the invention for the production of tough, water-soluble polymeric ester waxes, between 10% and 100% of the organic acid halide may be replaced by an equivalent molar proportion of an oxyhalide of phosphorus, such as phosphorus oxychloride. Between 10% and 50% of said acid halide may be replaced with an equivalent molar portion of a pentahalide of phosphorus such as phosphorus pentachloride or pentabromide, or a silicon tetrahalide such as silicon tetrachloride, somewhat less effectively. (Note Table I, items 6 to 10.) This modification of the invention in some cases has the important advantage that, while the same type of strong, tough, water-soluble waxes are secured, the process itself is simplified by minimizing or eliminating the tendency for the reaction mixture to foam or to form gels during the solvent stripping step under vacuum.

Table I

| A | B | C | Molar Ratio of Reactants A:B:C or A:B or A:C | Tough, Water-Soluble Super Ester Indicated Molecular Weight |
|---|---|---|---|---|
| Polyoxyethylene glycol Average Mol. Wt. | Halide of dicarboxylic acid | Inorganic acid halide | | |
| 6,000 | phthalyl chloride | | 1:2 | |
| 6,000 | ...do... | | 1:1 | 29,400 |
| 11,700 | ...do... | | 1:1 | 30,400 |
| 6,000 | succinyl chloride | | 1:1 | 47,200 |
| 6,000 | oxalyl chloride | | 1:1 | 59,400 |
| 6,000 | phthalyl chloride | $POCl_3$ | 9:6:2 | 47,000 |
| 6,000 | ...do... | $SiCl_4$ | 1:0.85:0.075 | |
| 6,000 | ...do... | $PCl_5$ | 9:6:2 | 29,600 |
| 6,000 | succinyl chloride | $POCl_3$ | 9:6:2 | 47,000 |
| 11,700 | phthalyl chloride | ...do... | 9:6:2 | 32,400 |

In the production of tough, hard, water-soluble polymeric ester waxes according to the modification of the invention wherein all of the acid halide of the dicarboxylic acid is replaced with a phosphorus oxyhalide such as phosphorus oxychloride, the various operating conditions of the process remain substantially the same, and the polyoxyethylene glycol and the phosphorus oxyhalide preferably are reacted in a molar ratio within the range between 1:0.33 and 1:1.33, while a ratio of 1:0.67 gives excellent results. The resultant products are tough, water-soluble waxes having initial softening points above 40° C. When using polyoxyethylene glycols having average molecular weights around 6,000 to 9,000, the products have softening points within the range between about 50° C. and 60° C.

Table I presents the data of certain representative runs made in accordance with the invention wherein tough, strong water-soluble polymeric esters were produced. No inert solvent was used in the first run. In all of the other runs with the exception of the fifth, benzene was used as the inert solvent; and in the fifth run xylene was used.

The friable, brittle water-soluble type of polymeric ester waxes may be produced in the process by replacing all of the acyl halide with an equivalent molar portion of a phosphorus trihalide or pentahalide, a silicon tetrahalide, or a thionyl halide, as exemplified by the data appearing in Table II and in various examples here presented.

Table II

| A | B | C | Molar Ratio of Reactants A:B:C or A:C | Super Ester | |
|---|---|---|---|---|---|
| Polyoxyethylene glycol Average Mol. Wt. | Halide of dicarboxylic acid | Inorganic acid halide | | Mol. Wt. | Toughness |
| 6,000 | phthalyl chloride | $PCl_3$ | 9:6:2 | 14,800 | friable. |
| 6,000 | ...do... | $SOCl_2$ | 3:2:1 | 17,300 | brittle tan wax. |
| 6,000 | | $PCl_5$ | 3:2 | 26,800 | friable white wax. |
| 6,000 | | $PCl_3$ | 3:2 | 13,500 | friable brittle wax. |
| 6,000 | | $SiCl_4$ | 4:1 | 8,800 | Do. |
| 6,000 | | $SOCl_2$ | 1:1 | 10,300 | brittle white wax. |

While a wide variety of inert solvents for the reactants can be employed, including the benzenoid hydrocarbons such as benzene, and the ethers such as dioxane, it is preferred to employ an inert volatile solvent capable of forming azeotropic mixtures with water, such as benzene or xylene, and to remove moisture from the polyoxyethylene glycol by azeotropic distillation with such solvent immediately prior to adding the acid halide reactant thereto. Where a catalyst such as sulfuric or other inorganic acid is used, it is added to the polyoxyethylene glycol, preferably in amount sufficient to bring the latter to the methyl orange point, prior to adding the acid halide reactant.

The following examples will serve to illustrate the invention:

EXAMPLE 1

An azeotropically dried solution of 600 parts (0.2 equivalent) of a polyoxyethylene glycol having an average molecular weight of about 6,000 in 352 parts of benzene was stirred at reflux temperature while mixing therewith 15.5 parts (0.2 equivalent) of succinyl chloride. The mixture was refluxed with agitation for 1.75 hour while passing nitrogen through it. It then was stripped of volatiles in a stripping still to a temperature of 180° C. at 60 mm. of mercury pressure. The residual product was very viscous at 180° C. and, when cool, was a very tough tan water-soluble wax. A 4.4% solution of the wax in dioxane at 20° C. had a relative viscosity of 7.90, indicating an average molecular weight of 47,200.

EXAMPLE 2

A mixture of 176 parts of benzene and 300 parts (0.1 equivalent) of a polyxyethylene glycol similar to that recited in Example 1 was refluxed using a distillation trap until no more water collected in the trap. After adding 0.45 part of sulfuric acid the mixture was refluxed and purged with dry air while 11 parts (0.14 equivalent) of succinyl chloride were added. After continuing the refluxing and purging for 1.5 hours, the mixture was stirpped of volatiles to a temperature of 200° C. at 20 mm. of mercury pressure. The residual product was a hard, tough, non-friable tan water-soluble wax melting at 51° C. and, in the range between 52° C. to 100° C. is a very viscous liquid.

EXAMPLE 3

(a) 600 parts (0.2 equivalent) of the polyoxyethylene glycol described in Example 1 were dehydrated azeotropically by means of 352 parts of benzene. To the dehydrated mixture were added 20 parts (0.2 equivalent) of phthalyl chloride, and the mixture was stirred, refluxed and purged with nitrogen for three hours. It then was stripped of volatiles to a kettle temperature of 170° C. at a pressure of 50 mm. of mercury. The residue was a tough, water-soluble wax, a 4.4% solution of which in dioxane had a viscosity at 20° C. of 5.29 which (using Staudinger's K=0.000146) indicates an average molecular weight of 29,400.

(b) In another run like the above with the exception that, after the dehydration step, 0.18 part of sulfuric acid was added to bring the mixture to the methyl orange end point, the product was substantialy the same as that described above, having an indicated average molecular weight of 29,600.

(c) By substituting xylene for benzene as the dehydrating solvent, and stripping the reaction mixture to a temperature of 200° C. under 40 mm. of mercury pressure, a similar tough water-soluble wax having an indicated average molecular weight of 47,200 was secured.

EXAMPLE 4

A solution in benzene of a water-free polyoxyethylene glycol having an average molecular weight of 4,000 was heated and refluxed for over five hours with a molecular equivalent of phthalyl chloride, while purging with dry air the hydrogen chloride evolved. After stripping the reaction mixture to a kettle temperature of 200° C. at 25 mm. of mercury pressure, the residue was a tan water-soluble wax considerably harder and tougher than the starting material.

EXAMPLE 5

To an azeotropically dried solution of 600 parts (0.2 equivalent) of a polyoxyethylene glycol having an average molecular weight around 6,000 in about 350 parts of xylene were added 12.7 parts (0.2 equivalent) of oxalyl chloride. The mixture was stirred at reflux temperature while being purged with dry nitrogen for three hours. It then was stripped of volatiles to a kettle temperature of 200° C. under 60 mm. of mercury pressure. The residual product was a very hard, tough, water-soluble wax. At 20° C. a 4.4% solution of the wax in dioxane had a viscosity of 9.67, indicating a relative average molecular weight of 59,400.

EXAMPLE 6

A mixture of 200 parts (0.05 mol) of a polyoxyethylene glycol with an average molecular weight of about 4,000 and 132 parts of benzene was dried azeotropically. The mixture was purged with air, stirred and refluxed during addition of 5.1 parts (0.033 mol) of phosphorus oxychloride and for two additional hours. The mixture then was stripped under vacuum to a temperature of 180° C. at 30 mm. of mercury pressure, yielding a tan water-miscible wax somewhat less tough than a corresponding wax made from a polyoxyethylene glycol having an average molecular weight around 6,000 and phosphorus oxychloride under generally similar conditions, and which was a tough non-friable tan water-soluble wax.

EXAMPLE 7

A dehydrated mixture of 31,800 parts of a polyoxyethylene glycol having an average molecular weight of around 6,000, and 18,600 parts of benzene was refluxed, and 180 parts of phosphorus oxychloride and 715 parts of phthalyl chloride were added and the refluxing and stirring continued while nitrogen was passed through the mixture to assist in removing the evolved hydrogen chloride. Thereafter the mixture was stripped to a kettle temperature of 145° C. at 13 mm. of mercury pressure, leaving as residue a tough, strong, water-soluble wax. A 4.4% solution of the wax in dioxane had a viscosity at 20° C. of 7.86, indicating a molecular weight of around 47,000. Izod tests performed on unnotched molded bars of the wax 0.5 inch x 0.5 inch x 2.5 inches showed impact strengths of 17.2 foot pounds per inch, whereas similar bars made from the polyoxyethylene glycol starting material had impact strengths around 0.32 foot pound per inch. The waxy super esters made according to this example commonly have freezing ranges between 50° and 55° C., and are soluble in water, benzene, dioxane, methanol and ethanol; and are slightly soluble in acetone and ethoxyethanol. They are useful in sizing, binding, lubricant and molding applications in the textile, paper, ceramic, adhesive and metal-casting industries.

A series of runs conducted under the general conditions recited in Example 7 yielded a series of tough, hard, water-soluble super esters having apparent molecular weights and impact strengths (Izod) recited in Table III. A typical sample of the wax had a freezing range of 50° C.—55° C., and a solubility in water at 20° C. greater than 10% by weight. A 10% aqueous solution of the ester had a viscosity at 25° C. of 20-30 centipoises and a specific gravity of 1.05.

Table III

| Sample No. | Molecular Weight of the Super Ester | Impact Strength, Foot pounds per inch |
|---|---|---|
| 1 | 43,500 | 21.6 |
| 2 | 43,500 | 18.0 |
| 3 | 45,000 | 21.4 |
| 4 | 61,500 | 21.4 |
| 5 | 50,500 | 20.8 |
| 6 [1] | about 6,000 | 0.32 |
| 7 [2] | 29,400 | 1.6 |

[1] The unreacted polyoxyethylene glycol, for comparison.
[2] The super ester of Example 3 (a), for comparison.

These Izod impact strengths are apparent indications of the true impact strengths of the materials. In the case of waxes having high impact strengths, the test bar sometimes permits the pendulum to pass without breaking of the bar. The Izod tests serve as a manufacturing control. Such tests were performed on un-notched molded bars of the wax 0.5 inch x 0.5 inch x 2.5 inches in size, using apparatus described on page 66 of "Handbook of Plastics," Simonds and Ellis (1943) Van Nostrand Co., Inc., New York, N. Y.

EXAMPLE 8

A mixture of 600 parts (0.102 equivalent) of a polyoxyethylene glycol having an average molecular weight of 11,700 and 352 parts of benzene was dried azeotropically and then stirred and refluxed during the addition of 10.4 parts (0.102 equivalent) of phthalyl chloride, and for three hours while being purged with a stream of nitrogen. The reaction mixture then was stripped to a kettle temperature of 170° C. at 80 mm. of mercury pressure, leaving as residue a tough, tan water-soluble wax having an indicated average molecular weight of 30,400, based upon relative viscosity measurements.

EXAMPLE 9

Under the conditions and using the polyoxyethylene glycol described in Example 8 but wherein the phthalyl chloride was replaced by a mixture of 6.9 parts (0.068 equivalent) of phthalyl chloride and 1.8 parts (0.034 equivalent) of phosphorus oxychloride, a tough tan water-soluble wax having an indicated molecular weight of 32,400 was secured. The polymeric ester made in accordance with this form of the process was an extremely tough and resilient water-soluble wax. Thin layers thereof were moderately flexible.

EXAMPLE 10

A mixture of 600 parts (0.2 equivalent) of a polyoxyethylene glycol having an average molecular weight of 6,000 and 352 parts of benzene was dehydrated azeotropically and then stirred at reflux temperature during the addition of 10.3 parts (0.133 equivalent) of succinyl chloride and 3.4 parts (0.067 equivalent) of phosphorus oxychloride. After stirring, refluxing and purging the mixture with nitrogen for 1.5 hours, it was stripped to a kettle temperature of 200° C. at 40 mm. of mercury pressure. The residue was a tough, brown, water-soluble wax having an indicated average molecular weight of 47,000.

EXAMPLE 11

An azeotropically dried solution of 150 parts (0.05 equivalent) of a polyoxyethylene glycol having an average molecular weight of 6,000 in 110 parts of benzene was stirred and refluxed for two hours with 4.3 parts (0.0425 equivalent) of phthalyl chloride. After adding 0.32 part (0.0075 equivalent) of silicon tetrachloride, the mixture was stirred and refluxed another three hours. It then was stripped to a kettle temperature of 150° C. at 30 mm. of mercury pressure, leaving as still residue a tough, water-soluble wax.

EXAMPLE 12

An azeotropically dried solution of 600 parts (0.2 equivalent) of polyoxyethlyene glycol (average molecular weight 6,000) in 352 parts of benzene was stirred during addition of 13.5 parts (0.133 equivalent) of phthalyl chloride and 4.65 parts (0.067 equivalent, based upon 3 reactive chlorine atoms per molecule) of phosphorus pentachloride. After refluxing with agitation and purging with nitrogen for three hours, the product was stripped to a kettle temperature of 170° C. at 50 mm. of mercury pressure, yielding a moderately tough water-soluble wax having an indicated average molecular weight of 29,600.

EXAMPLE 13

A solution of 600 parts (0.2 equivalent) of polyoxyethylene glycol (average molecular weight 6,000) in 352 parts of benzene was dried azeotropically, and then stirred and refluxed during the addition of 9.2 parts (0.2 equivalent) of phosphorus trichloride, hydrogen chloride being removed as released. The reaction mixture was stripped to a kettle temperature of 200° C. at 100 mm. of mercury pressure, yielding as residue a somewhat friable white wax having an indicated average molecular weight of 26,800.

EXAMPLE 14

A mixture of 600 parts (0.2 equivalent) of a polyoxyethylene glycol having an average molecular weight of 6,000 and about 350 parts of xylene was dehydrated azeotropically. The mixture then was stirred at reflux temperature during the addition of 18.3 parts (0.2 equivalent) of adipyl chloride. The reaction mixture was stirred, purged with nitrogen, and refluxed for two hours at the said temperature, after which it was stripped of volatiles at a kettle temperature of 180° C. under 30 mm. of mercury pressure. The residual product was a very tough tan water-soluble wax, a 4.4% solution of which in dioxane at 20° C. had a relative viscosity of 8.87, indicating an average molecular weight of 53,900.

EXAMPLE 15

Following the procedure and conditions recited in Example 14, with the exception that 23.9 parts (0.2 equivalent) of sebacyl chloride were used in place of the adipyl chloride, and the stripping step was conducted to a kettle temperature of 180° C. under 25 mm. of mercury pressure, a very tough tan water-soluble wax having an indicated average molecular weight of 59,700 was secured.

The values herein recited for the indicated average molecular weights of the polymeric ester waxes of this invention are relative values based upon measurements of the viscosity at 20° C. of a 4.4% solution of the wax in dioxane, using a modified Ostwald viscosimeter of the type designated in A.S.T.M., D-445-42-T, Method B.

Calculations are based upon Staudinger's formula $$\text{Molecular weight} = \frac{\text{Specific viscosity}}{K_m}$$

where $K_m$ is 0.000146

The term "water-soluble" is used in the specification and claims to designate those polymeric esters of the invention all portions of which are completely soluble in water at 25° C., and a saturated aqueous solution of which contains at least 10% of the ester.

The expression "equivalent proportions" and similar expressions appearing in the specification and claims are intended to indicate stoichiometric proportions providing one halide atom for each hydroxyl group in the polyoxyethylene glycol.

The invention is susceptible of modification within the scope of the appended claims.

I claim:

1. Process for producing from polyoxyethylene glycols tough, waxy, water-soluble polymeric esters of greatly increased molecular weight, which comprises heating and reacting a substantially dry polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids, in the presence of a dry volatile solvent inert to the reactants, while flowing through the reaction mixture a gas inert to the reactants and continuously removing hydrogen halide formed in the reaction, said glycol and said acid halide being reacted in a molar ratio within the range between 1:0.5 and 1:2, and recovering from the resultant reaction mixture the said tough, water-soluble polymeric ester thus produced having an average molecular weight at least twice that of said glycol.

2. Process for producing from polyoxyethylene glycols tough, waxy, water-soluble polymeric esters of greatly increased molecular weight, which comprises heating and reacting a substantially dry polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids, in the presence of a dry inert volatile solvent for the reactants while removing hydrogen halide formed in the reaction, said glycol and said acid halide being reacted in a molar ratio within the range between 1:0.5 and 1:2, and recovering from the reaction mixture the tough, water-soluble polymeric ester thus produced having an average molecular weight at least twice that of said glycol.

3. Process for producing from polyoxyethylene glycols, tough, water-soluble wax-like polymeric esters of greatly increased average molecular weight, which comprises reacting a solution in a benzenoid hydrocarbon of a substantially dry polyoxyethylene glycol having an average molecular weight of at least 6,000 with an acid halide selected from the class consisting of the acid halides of saturated aliphatic dicarboxylic acids and the acid halides of benzene dicarboxylic acids, for at least 1.5 hours at an elevated temperature while removing hydrogen halide formed in the reaction, the said glycol and said acid halide being reacted in a molar ratio within the range between 1:0.5 and 1:2, and recovering from the resultant reaction mixture at a temperature no higher than around 200° C., the tough, waxy, water-soluble polymeric ester of high molecular weight present therein.

4. Process for producing from polyoxyethylene glycols, tough, waxy, water-soluble polymeric esters of greatly increased molecular weight, which comprises heating and reacting a dry polyoxyethylene glycol having an average molecular weight of at least 4,000 with an acid chloride of a saturated aliphatic dicarboxylic acid having at least two carbon atoms in the molecule, in the presence of an inert volatile solvent for the reactants, while removing hydrogen halide released by the reaction, said glycol and said acid chloride being reacted in a molar ratio within the range between 1:0.5 and 1:2, and recovering from the reaction mixture the water-soluble polymeric ester thus produced.

5. Process for producing from polyoxyethylene glycols tough, waxy, water-soluble polymeric esters of greatly increased molecular weight, which comprises heating and reacting a dry polyoxyethylene glycol having an average molecular weight of at least 4,000 with succinyl chloride in the presence of an inert volatile solvent for the reactants, said glycol and said succinyl chloride being reacted in a molar ratio within the range between 1:0.5 and 1:2, while flowing through the reaction mixture a gas inert to the reactants, thereby removing hydrogen halide released by the reaction, and recovering from the reaction mixture the tough water-soluble polymeric ester thus produced.

6. Process for producing from polyoxyethylene glycols tough, waxy, water-soluble polymeric esters of greatly increased molecular weight, which comprises heating and reacting a dry polyoxyethylene glycol having an average molecular weight of at least 4,000 with phthalyl chloride, in the presence of an inert volatile solvent for the reactants, said glycol and said phthalyl chloride being reacted in a molar ratio within the range between 1:0.5 and 1:2, while flowing through the reaction mixture a gas inert to the reactants, thereby removing hydrogen halide released by the reaction, and recovering from the reaction mixture the tough water-soluble polymeric ester thus produced.

7. Process for producing from polyoxyethylene glycols waxy, water-soluble polymeric esters of greatly increased molecular weight, which comprises heating and reacting a substantially dry polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids and a halogen-containing compound selected from the group consisting of the halides and oxyhalides of phosphorus, the halides of silicon, and the oxyhalides of sulfur, the total amount of said acid halide and said halogen-containing compound being sufficient to provide reactive halogen atoms equivalent to from 50% to 200% of the hydroxyl groups of said polyoxyethylene glycol, and said halogen-containing compound constituting between 10 and 50 mol per cent of the total of said compound plus said acid halide, while removing hydrogen halide formed in the reaction, in the presence of an inert volatile solvent for the reactants, and recovering from the reaction mixture the water-soluble polymeric ester thus produced.

8. Process for producing from polyoxyethylene glycols tough, waxy, water-soluble polymeric esters of greatly increased molecular weight, which comprises heating and reacting a dry polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids together with a phosphorus oxyhalide, in the presence of an inert volatile solvent for the reactants, while removing hydrogen halide released by the reaction, the total amount of said acid halide and said oxyhalide being sufficient to provide reactive halogen atoms equivalent to between 50% and 200% of the hydroxyl groups of the polyoxyethylene glycol used, and said oxyhalide being in amount the molar equivalent of from 10% to around 100% of said acid halide, and recovering from the reaction mixture the tough water-soluble polymeric ester thus produced.

9. Process for producing from polyoxyethylene glycols, tough, waxy, water-soluble polymeric esters of greatly increased molecular weight, which comprises heating and reacting a dry, polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids together with phosphorus pentahalide in the presence of an inert volatile solvent for the reactants, while removing hydrogen halide released by the reaction, the total amount of said acid halide and said phosphorus pentahalide being sufficient to provide reactive halogen atoms equivalent to between 50% and 200% of the hydroxyl groups of the polyoxyethylene glycol used, and said pentahalide being in amount the molar equivalent of from 10% to around 100% of said acid halide, and recovering from the reaction mixture the tough water-soluble polymeric ester thus produced.

10. Process for producing from polyoxyethylene glycols, tough, waxy, water-soluble polymeric esters of greatly increased molecular weight, which comprises heating and reacting a dry, polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids together with up to 70% of a silicon tetrahalide, based upon the weight of said acid halide, in the presence of an inert volatile solvent for the reactants, the total amount of said acid halide and said silicon tetrahalide being sufficient to provide reactive halogen atoms equivalent to from 50% to 200% of the hydroxyl groups of the polyoxyethylene glycol used, while removing hydrogen halide released by the reaction, and recovering from the reaction mixture the tough water-soluble polymeric ester thus produced.

11. Process for producing from polyoxyethylene glycols waxy, water-soluble polymeric esters of greatly increased molecular weight, which comprises heating and reacting a substantially dry polyoxyethylene glycol having an average molecular weight of at least 4,000 with a halogen-containing compound selected from the group consisting of the halides and oxyhalides of phosphorus, the halides of silicon, and the oxyhalides of sulfur, the said glycol and said halogen-containing compound being reacted in a molar ratio within the range between 1:0.5 and 1:2, in the presence of an inert volatile solvent for the reactants, and recovering from the reaction mixture the water-soluble polymeric ester thus produced.

12. Process for producing from polyoxyethylene glycols tough, waxy, water-soluble polymeric esters of greatly increased molecular weight, which comprises heating and reacting a dry polyoxyethylene glycol having an average molecular weight of at least 4,000 with a phosphorus oxyhalide, in a molar ratio within the range between 1:0.33 and 1:1.33, in the presence of an inert volatile solvent for the reactants, while removing hydrogen halide released by the reaction, and recovering from the reaction mixture the tough, water-soluble polymeric ester thus produced.

13. A tough, water-soluble, wax-like polymeric ester product of the reaction according to claim 2 of a polyoxyethylene glycol having an average molecular weight of at least 6,000 and an acyl halide of a dicarboxylic acid selected from the class consisting of the acid halides of saturated aliphatic dicarboxylic acids and the acid halides of benzene dicarboxylic acids, said product having an average molecular weight at least twice that of said glycol.

14. A water-soluble polymeric ester having an indicated average molecular weight of over 8,000, which ester is a product of the reaction according to claim 7 of a polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids and a minor portion, based upon said acid halide, of a halogen-containing compound selected from the class consisting of the halides and oxyhalides of phosphorus, the halides of silicon, and the oxyhalides of sulfur.

15. A tough, water-soluble, wax-like polymeric reaction product having an initial softening point at least 40° C. and an average molecular weight of over 8,000, which product is produced by heating and reacting a substantially dry polyoxyethylene glycol having an average molecular weight of at least 4,000 with between 0.5 and 2 molecular equivalents of an acid halide of a dicarboxylic acid selected from the class consisting of the acid halides of saturated aliphatic dicarboxylic acids and the acid halides of benzene dicarboxylic acids, and with an oxyhalide of phosphorus, the total halide content of said acid halide and said oxyhalide being sufficient to provide reactive halogen groups equivalent to at least 50% and not substantially more than 200% of the hydroxyl groups of said polyoxyethylene glycol, in the presence of an inert volatile solvent for the reactants, while removing hydrogen halide released by the resultant reaction.

16. A tough, water-soluble, wax-like polymeric reaction product having an initial softening point of at least 40° C. and a greatly increased average molecular weight of over 8,000, which product is made by heating and reacting a substantially dry polyoxyethylene glycol having an average molecular weight of at least 4,000 with an acid halide of a dicarboxylic acid selected from the class consisting of the acid halides of saturated aliphatic dicarboxylic acids and the acid halides of benzene dicarboxylic acids, and with a phosphorus oxyhalide, in the presence of an inert volatile solvent for the reactants, while removing hydrogen halide released by the resultant reaction, the said glycol and the total of said acid halide and said oxyhalide being present in a molar ratio within the range between 1:0.5 and 1:2, and the said oxyhalide being in an amount the molar equivalent of from 10% to approximately 100% of said acid halide.

17. A tough, water-soluble, wax-like polymeric ester product of the reaction according to claim 8, of at least one polyoxyethylene glycol having an average molecular weight of at least 6,000, an acyl halide of a dicarboxylic acid selected from the class consisting of the acid halides of saturated aliphatic dicarboxylic acids and the acid halides of benzene dicarboxylic acids, and an oxyhalide of phosphorus, said product having an average molecular weight at least twice that of said glycol.

18. A tough, water-soluble wax-like polymeric ester having an average molecular weight of at least 29,000, which polymeric ester is made by reacting a solution in a benzenoid hydrocarbon of a substantially dry polyoxyethylene glycol having an average molecular weight of at least 6,000, an acid halide selected from the class consisting of the acid halides of saturated aliphatic dicarboxylic acids and the acid halides of benzene dicarboxylic acids, and a phosphorus oxyhalide, at an elevated temperature no higher than the refluxing temperature of the mixture while removing hydrogen halide formed in the reaction, the said glycol and the total of said acid halide and said oxyhalide being present in a molar ratio within the range between 1:0.5 and 1:2, and the said oxyhalide being in an amount the molar equivalent of from 10% to approximately 100% of said acid halide, thereafter stripping said benzenoid hydrocarbon from the reaction mixture under vacuum at elevated temperatures not substantially higher than around 200° C., and recovering the residual tough, waxy, water-soluble polymeric ester of high molecular weight.

19. A tough, water-soluble, wax-like polymeric reaction product defined in claim 16 wherein the said acid halide used is phthalyl chloride and the said oxyhalide is phosphorus oxychloride.

20. A tough, water-soluble, wax-like polymeric reaction product defined in claim 15 wherein the said acid halide used is phthalyl chloride and the said oxyhalide is phosphorus oxychloride.

21. A tough, water-soluble, wax-like polymeric ester product of the reaction according to claim 9, of at least one polyoxyethylene glycol having an average molecular weight of at least 6,000, an acyl halide of a dicarboxylic acid selected from the class consisting of the acid halides of saturated aliphatic dicarboxylic acids and the acid halides of benzene dicarboxylic acids, and a pentahalide of phosphorus, said product having an average molecular weight at least twice that of said glycol.

22. A tough, water-soluble, wax-like polymeric ester product of the reaction according to claim 10 of at least one polyoxyethylene glycol having an average molecular weight of at least 4,000, an acyl halide of a dicarboxylic acid selected from the class consisting of the acid halides of saturated aliphatic dicarboxylic acids and the acid halides of benzene dicarboxylic acids, and a silicon tetrahalide, said product having an average molecular weight at least twice that of said glycol.

23. A water-soluble polymeric ester having an indicated average molecular weight of over 8,000, which ester is a product of the reaction according to claim 11 of a polyoxyethylene glycol having an average molecular weight of at least 4,000 with a halogen-containing compound selected from the class consisting of the halides and oxyhalides of phosphorus, the halides of silicon, and the oxyhalides of sulfur.

24. A tough, water-soluble, wax-like polymeric ester product of the reaction according to claim 12 of a polyoxyethylene glycol having an average molecular weight of at least 6,000 and an oxyhalide of phosphorus, said product having an average molecular weight of at least 29,000.

SAMUEL M. LIVENGOOD.

REFERENCES CITED

The following references are of record in the file of this patent:

UNITED STATES PATENTS

| Number | Name | Date |
|---|---|---|
| 1,970,510 | Ellis | Aug. 14, 1934 |
| 2,058,394 | Arvin | Oct. 27, 1936 |
| 2,094,608 | Kritchevsky | Oct. 5, 1937 |
| 2,166,542 | Bradley | July 18, 1939 |
| 2,275,494 | Bennett | Mar. 10, 1942 |
| 2,388,206 | Boulton, et al. | Oct. 30, 1945 |
| 2,437,046 | Rothrock et al. | Mar. 2, 1948 |

FOREIGN PATENTS

| Number | Country | Date |
|---|---|---|
| 318,222 | Germany | Jan. 10, 1920 |
| 849,985 | France | Oct. 28, 1939 |

OTHER REFERENCES

Carothers-Collected Papers, Sub. 1940 by Interscience Publishers, Inc. New York.

Groggins, Unit Processes in Org. Synthesis, 1st ed., 1935, page 515.